(12) United States Patent
Nakada et al.

(10) Patent No.: US 6,349,596 B1
(45) Date of Patent: Feb. 26, 2002

(54) THERMAL TYPE AIR FLOW SENSOR

(75) Inventors: Keiichi Nakada; Izumi Watanabe; Hiroshi Yoneda, all of Hitachinaka (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/461,190

(22) Filed: Dec. 15, 1999

(30) Foreign Application Priority Data

Dec. 15, 1998 (JP) .......................................... 10-355978

(51) Int. Cl.$^7$ ................................................. G01F 1/68
(52) U.S. Cl. .................................. 73/204.26; 73/204.15
(58) Field of Search .......................... 73/204.15, 204.26, 73/204.17, 204.18

(56) References Cited

U.S. PATENT DOCUMENTS 5,237,867 A * 8/1993 Cook ....................... 73/204.15
5,393,351 A * 2/1995 Kinard et al. ............. 73/204.26
6,192,749 B1 * 2/2001 Marek et al. ............. 73/204.25

FOREIGN PATENT DOCUMENTS

| JP | 2-259527 | 10/1990 |
|----|----------|---------|
| JP | 4-320927 | 11/1992 |
| JP | 6-50783 | 2/1994 |
| JP | 6-273208 | 9/1994 |
| JP | 8-14976 | 1/1996 |
| JP | 10-500490 | 1/1998 |
| JP | 10-160538 | 6/1998 |
| WO | WO 96/28712 | 9/1996 |

* cited by examiner

Primary Examiner—Harshad Patel
(74) Attorney, Agent, or Firm—Crowell & Moring LLP

(57) ABSTRACT

A thermal type air flow sensor which corrects variation of characteristics of a thermal type air flow sensor due to adherence or deposition of fouling contained in an intake air for maintaining an initial accuracy. An air flow rate is measured by means of a heating resistor and a temperature measuring resistor formed by semiconductor fine patterning. A part of the semiconductor substrate is removed. The heating resistor and a portion of the temperature measuring resistor are formed above a space defined by removing the semiconductor substrate. A voltage of the portion of the temperature measuring resistor located above the space is detected for correcting an error in measurement of an intake air using the voltage detected.

6 Claims, 9 Drawing Sheets

FIG. 13A
PRIOR ART
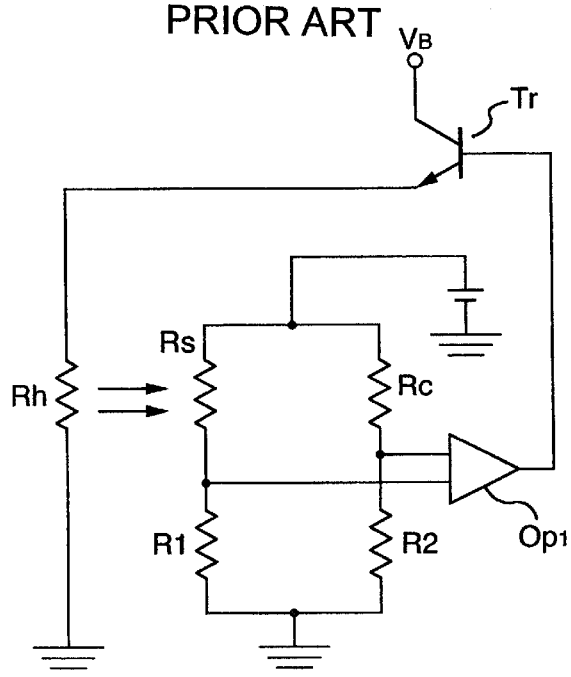
FIG. 13B
PRIOR ART
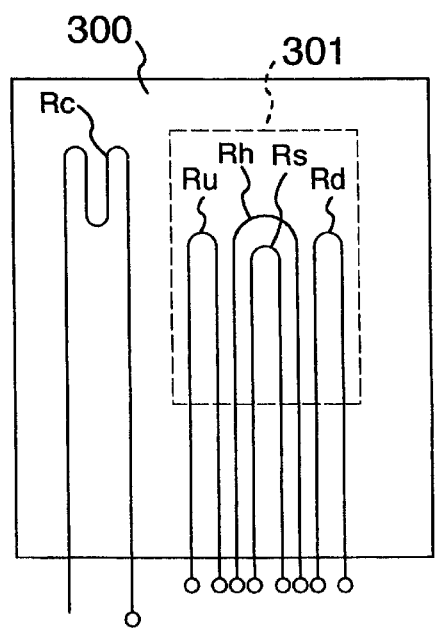
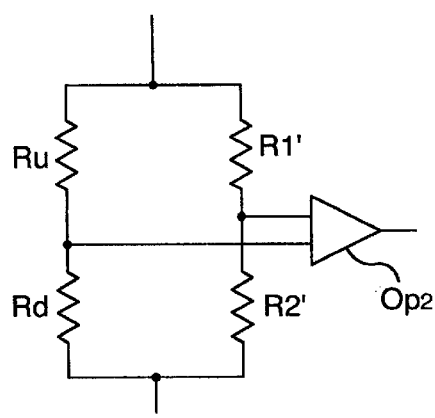

THERMAL TYPE AIR FLOW SENSOR

BACKGROUND OF THE INVENTION

The present invention relates to a thermal type air flow sensor for measuring an air flow rate employing a heating resistor. More particularly, the invention relates to a thermal type air flow sensor suitable for measuring an intake air flow rate of an internal combustion engine or so forth.

Conventionally, a thermal type air flow sensor has been used as a sensor for measuring an intake air flow rate flowing through an air intake passage of an internal combustion engine of an automotive vehicle or so forth. Such thermal type air flow sensor has been evaluated for capability of directly detecting a mass flow rate.

In the recent year, a thermal type air flow sensor fabricated by a semiconductor fine patterning technology on a semiconductor substrate, such as silicon (Si) or the like, has been attracting attention for capability of fabrication in relatively easy and by a mass production system, and of driving at low power.

As a basic principle of the thermal type air flow sensor employing such conventional semiconductor technology, there is one illustrate in FIGS. 12A and 12B, for example.

FIG. 12A is a circuit diagram of the thermal type air flow sensor and FIG. 12B is a plan view showing a layout of a heating resistor Rh and an air temperature measuring resistor Rc for measuring air flow rate.

The heating resistor Rh of shown example operates as both of an air flow rate measuring element and a heater. On the other hand, an air temperature measuring resistor Rc is used for control to maintain a temperature difference of the heating resistor and an air temperature constant even when a temperature of an intake air is varied. These resistors Rh and Rc are formed with temperature sensitive resistors having common directionality of variation of resistance values relative to a temperature. Resistance values of the heating resistor Rh and the air temperature measuring resistor Rc are set so that a large current flows through the heating resistor Rh for causing heat generation, and, in contrast, a little current not causing little heat generation flows through the air temperature measuring resistor Rc. These heating resistor Rh and the air temperature measuring resistor Rc form a bridge circuit together with fixed resistors R1 and R2. A voltage between the resistors Rh and R1 and a voltage between resistors Rc and R2 are input to an operational amplifier Op for controlling a heating current flowing through the heating resistor Rh via the operational amplifier Op and a transistor Tr so that a temperature difference between the heating resistor Rh and an air temperature (air temperature measuring resistor Rc) becomes a predetermined temperature ΔTh. The heating current becomes a value corresponding to an air flow rate. Then, by converting this current into a voltage by the resistor R1, the air flow rate is detected.

As shown in FIG. 12B, upon fabricating the heating resistor Rh and the air temperature measuring resistor Rc by semiconductor fine patterning on a semiconductor substrate 300, the heating resistor Rh and the air temperature measuring resistor Rc are formed via an electrically insulative film (electrically insulative layer) on the semiconductor substrate 300, such as a silicon (Si) substrate or the like. However, concerning the heating resistor Rh, a part of the semiconductor substrate 300 is removed to certainly define a space (cavity portion) 301 to arrange the overall heating resistor Rh via the electrically insulative layer on the space 301 formed by removal of part of the semiconductor substrate. Thus, escape of heat of the heating resistor Rh by heat transmission through the semiconductor substrate 300 can be avoided (prevention of heat radiation other than air flow rate). On the other hand, the air temperature measuring resistor Rc is required to restrict heat generation as small as possible so as to enhance accuracy of measurement of air temperature. Therefore, the air temperature measuring resistor Rc is arranged on the semiconductor substrate 300 outside of the space 301.

FIGS. 13A and 13B are illustration showing a principle of another example of the conventional thermal type air flow sensor.

In the shown example, a temperature measuring resistor Rs heated by the heating resistor Rh (which temperature measuring resistor Rs is as it were, a temperature sensing resistor detecting a heat of the heating resistor Rh), a air temperature measuring resistor Rc and fixed resistors R1 and R2 form a bridge circuit. A voltage between the resistors Rs and R1 and a voltage between the resistors Rc and R2 are input to an operational amplifier Op1 to control a heating current flowing through the heating resistor Rh via the bridge circuit, the operational amplifier Op1 and the transistor Tr so that a temperature difference between the temperature measuring resistor Rs, thus the heating resistor Rh and the air temperature (air temperature measuring resistor Rc) is maintained at a predetermined temperature. The heating resistor Rh this managed the temperature heats a temperature measuring resistor Ru arranged upstream side of the heating resistor Rh and also a temperature measuring resistor Rd arranged downstream side of the heating resistor Rh. The temperature measuring resistors Ru and Rd form a bridge circuit together with fixed resistors R1' and R2'. When air flow is generated, a difference of calorific values to be removed from the upstream side and downstream side temperature measuring resistors Ru and Rd depending upon air flow rate due to positional relationship thereof. By detecting the difference by an operational amplifier Op2, air flow rate can be detected.

Even in such type, the air temperature measuring resistor Rc to be used for maintaining the temperature difference between the heating resistor Rh and the air temperature at a predetermined value, is arranged outside of the cavity portion 301 formed by removing a part of substrate 300. On the other hand, all of the heating resistor Rh and the temperature measuring resistors Rs, Ru and Rd intended to be heated by the heating resistor are arranged on the cavity portion 301 via the electrically insulative layer (electrically insulative film).

As the thermal type air flow sensor utilizing the principle set forth above, there are sensors disclosed in JP-A-2-259527, JP-A-4-320927, JP-A-6-273208, JP-A-6-50783, JP-A-8-14976, JP-A-10-160538, and Tokuhyo Hei No. 10-500490.

In the prior art set forth above, sufficient consideration has not been given for an error in detection of air flow rate in the case where fouling substance, such as dust or so forth contained in the intake air, adheres or deposits on a surface of the thermal type air flow sensor. If such thermal type air flow sensor is continuously used for a relatively long period, it is expected that the initial accuracy cannot be maintained for the reason set forth above.

As fouling substances for the thermal type air flow sensor possibly contained in the intake air of the internal combustion engine may be Si, Fe, Ca, Mg, Na contained in solid particle, typically sand, NaCl, MgCl$_2$, CaCl$_2$ contained in snow melting agent, engine lubricant oil contained in blow-by gas, $H_2O$, C, an impregnating oil of an air filter in a wet type air cleaner, and so forth, for example. The substances set forth above may adhere on the surface of the thermal type air flow sensor due to intermolecular attraction, liquid bridging force, electrostatic force, and composite force thereof.

Once the fouling substance adhere on the surface of the thermal type air flow sensor, thermal transmission from the heating resistor to ambient air or aspect of thermal transmission can be varied due to the adhered or deposited substance to degrade accuracy of measurement to be insufficient. Such problem can be caused even for different types of thermal type air flow sensors as illustrated in FIGS. 12A, 12B and 13.

SUMMARY OF THE INVENTION

The present invention has been worked out in view of the problems set forth above. Therefore, it is an object of the present invention to provide a thermal type air flow sensor which can correct variation of characteristics of a thermal type air flow sensor due to adhesion or deposition of fouling substance contained in an intake air and thus can maintain initial accuracy.

According to the basic construction of the present invention, a thermal type air flow sensor for measuring an air flow rate using a heating resistor and a temperature measuring resistor for measuring an air temperature, comprises:

a semiconductor substrate, a part of which is removed for defining a space therein;

the heating resistor and a portion of the temperature measuring resistor being formed above the space via an electrically insulative layer, remaining portion of the temperature measuring resistor being formed on the semiconductor substrate at a location offsetting from the space; and means for correcting an air flow rate measurement error on the basis of a voltage of the portion of the temperature measuring resistor located above the space.

A resistance value of the temperature measuring resistor is set to be sufficiently greater than that of the heating resistor to flow extremely low current for suppressing heating. While a little heating is caused in the temperature measuring resistor by the extremely low current, since most portion of the temperature measuring resistor is offset from the space defined by removing the semiconductor substrate, heat is transmitted to the semiconductor substrate via the electrically insulative layer. Thus, the temperature measuring resistor generate little heat.

In the present invention, since the portion of the temperature measuring resistor is located above the space, the portion of the temperature measuring resistor is thermally isolated by the space. As a result, heat transmission to the semiconductor substrate from this portion is little to cause a little self-heat generation. The self-heat generation is caused in completely the same manner as heating in the heating resistor except for the current value to flow. On the other hand, since the temperature measuring resistor is in contact with the intake air in completely the same manner as the heating resistor, fouling may deposit in the similar manner as the heating resistor. Accordingly, by deposition of the fouling, variation of heat conduction and heat transmission is caused in the similar manner as the heating resistor.

When self-heating ability is provided for the portion of the temperature measuring resistor as set forth above, if the heat conductivity and heat transmitivity are varied by deposition of fouling on the temperature measuring resistor as set forth above, variation of voltage is caused associating with variation of characteristics due to variation of heating condition, and thus variation of resistance characteristics even when a given voltage is applied to the temperature measuring resistor. Accordingly, when the voltage (potential difference) of the portion (portion where heating ability is provided) of the temperature heating resistor, is detected, it becomes possible to indirectly detect characteristics variation of the heating resistor due to deposition of fouling, and also to correct the detected value of the air flow rate utilizing the voltage thus detected.

It should be noted that the temperature measuring resistor used for control for maintaining a difference of the temperature of the heating resistor and the air temperature constant, it is originally preferred to restrict heating ability. However, when heating ability is provided only for the portion of the temperature measuring resistor as in the present invention, little influence may be caused on the accuracy of air flow rate measurement. Rather, by correction of measurement error associating with variation of characteristics of the heating resistor due to deposition of fouling, it may contribute for improvement of accuracy of air flow rate.

It should be noted that as an example of heating of the temperature measuring resistor, there is a technology disclosed in JP-A-8-14976. This prior art is intended to improve response characteristics of the thermal type air flow sensor and heats the overall temperature measuring resistor. In the present invention, is differentiated from the technology disclosed in JP-A-8-14976 in that overall temperature heating resistor is heated, and a part of voltage of the temperature measuring resistor (voltage of the resistor portion of the temperature measuring resistor partially arranged above the space of the semiconductor substrate) is utilized for correction of measuring error.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIGS. 13A and 13B are explanatory illustrations showing the basic principle of the thermal type air flow sensor.

DESCRIPTION OF THE EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
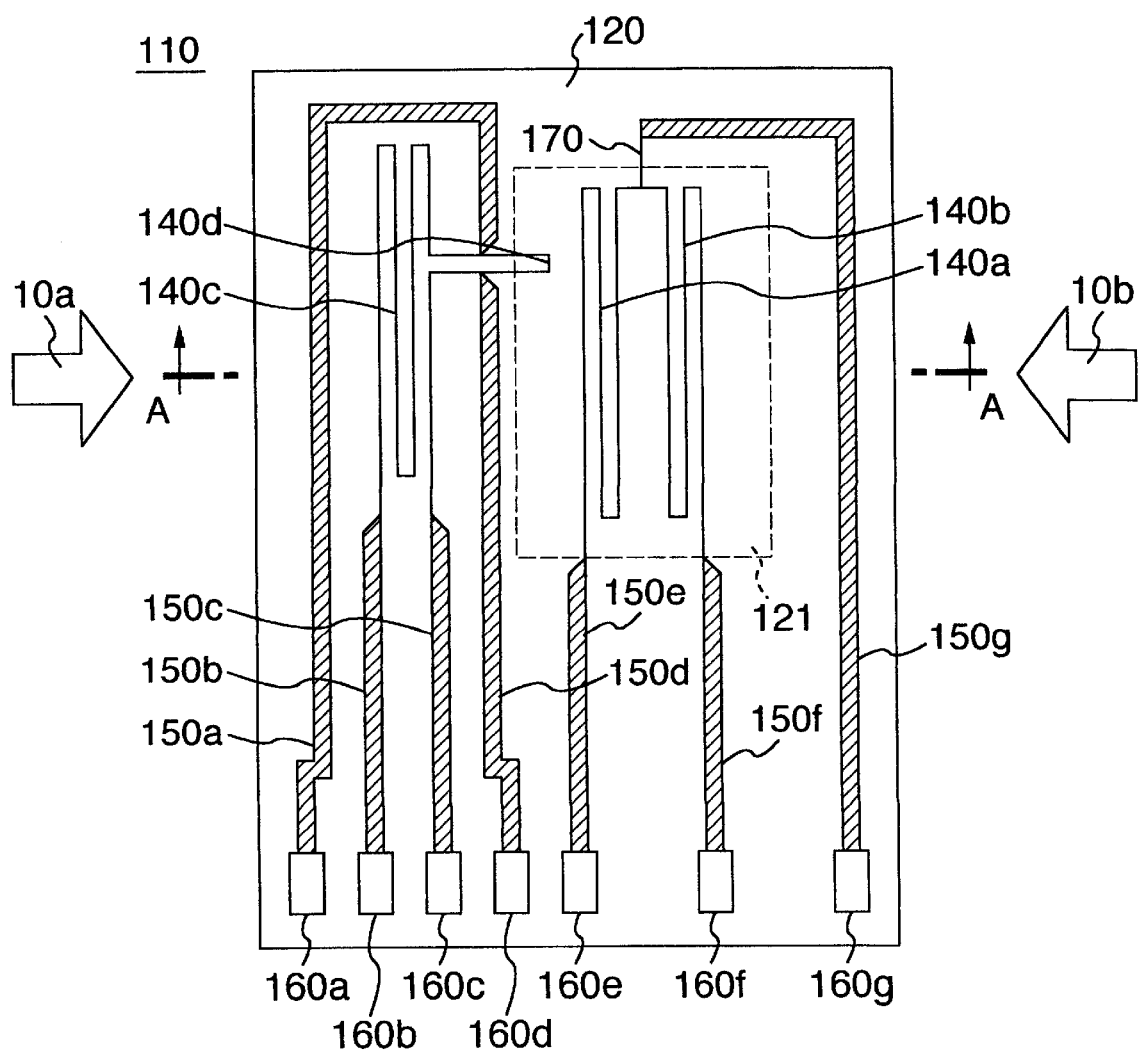
FIG. 1 is a plan view showing an element in the first embodiment of a thermal type air flow sensor according to the present invention.
Figure 2:
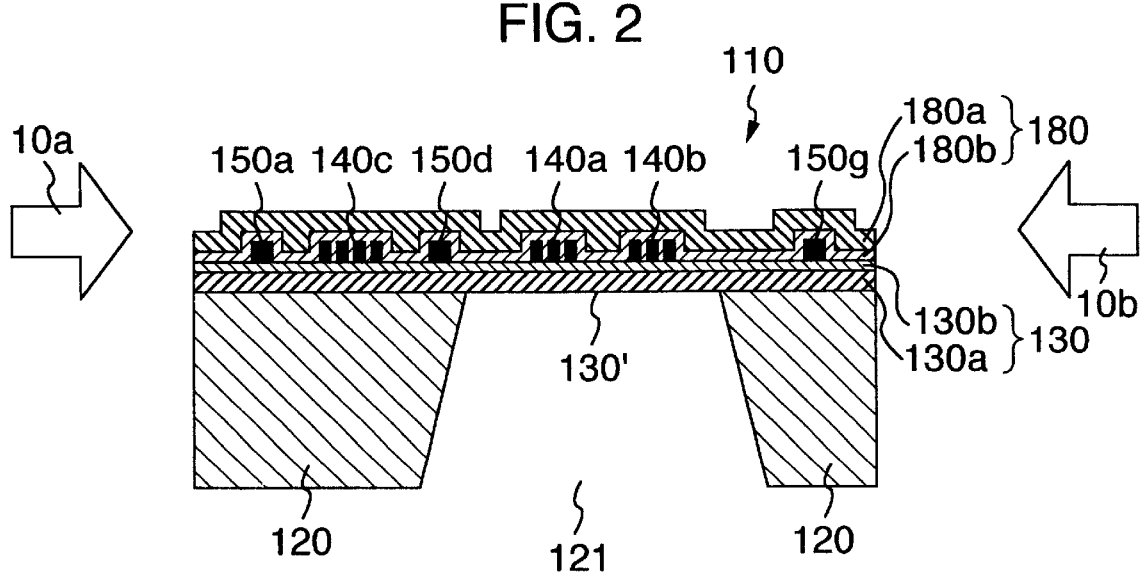
FIG. 2 is a sectional view of the element of the thermal type air flow sensor of FIG. 1 as taken along line A—A of FIG. 1.

FIG. 1 is directed to the first embodiment of a thermal type air flow sensor according to the present invention, and is plan view particularly showing a detecting portion (depending element) 110, and FIG. 2 is a sectional view taken along line A—A of FIG. 1.

Figure 12A:
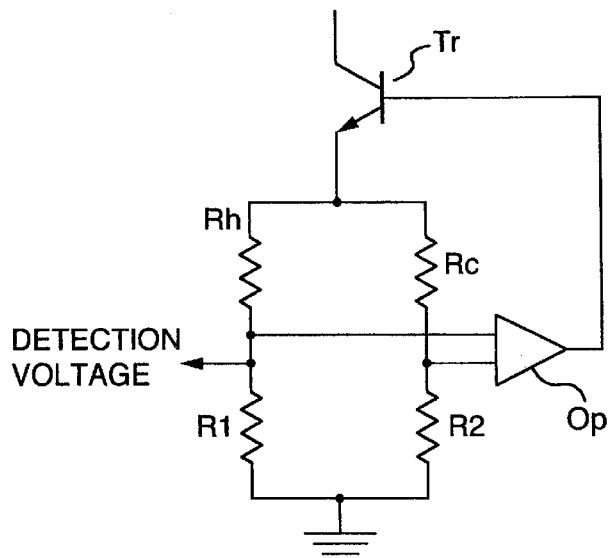
FIGS. 12A and 12B are explanatory illustrations showing basic principle of the thermal type air flow sensor.
Figure 12B:
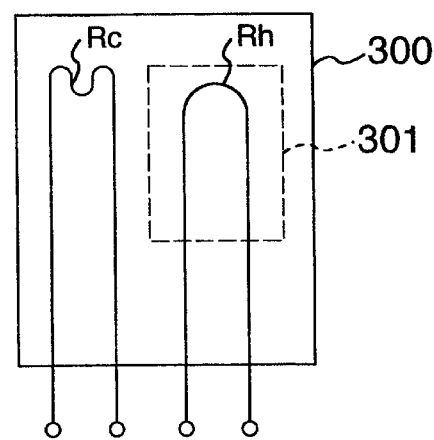

Among elements to be used in a thermal type air flow sensor element 110 in the shown embodiment (hereinafter referred to as "element"), resistors identified by reference numerals 140a and 140b correspond to a heating resistor Rh set forth in connection with FIGS. 12A, 12B and 13. In the shown embodiment, in order to additionally detect directionality of air flow, with reference to a direction of normal air flow 10a in an air intake passage of an internal combustion engine, the thermal type air flow sensor is divided into an upstream side heating resistor 140a and a downstream side heating resistor 140b. These upstream side and downstream side heating resistors 104a and 140b are connected in series. A voltage between the resistors 140a and 140b is lead out via a lead wire 150e, a terminal 160e and a lead wire 150f, a terminal 160f. A principle of detection of directionality using the upstream side heating resistor 140a and the downstream side heating resistor 140b will be discussed later.

The resistors identified by the reference numerals 140c and 140d corresponds to a air temperature measuring resistor (temperature sensing resistor) Rc discussed in connection with FIGS. 12 and 13.

As shown in FIG. 2, an electrically insulative layer (electrically insulative film) 130 is formed on a monocrystalline silicon substrate (semiconductor substrate) 120. On the electrically insulative layer 130, the upstream side heating resistor 140a, the downstream side heating resistor 140b and an air temperature measuring resistor 140c (including 140d) are formed.

The upstream side heating resistor 140a is arranged on upstream side with respect to a direction of intake air flow 10a, and the downstream side heating resistor 140b is arranged on downstream side of the upstream side heating resistor 140a. The air temperature measuring resistor 140c is designed for measuring a temperature of the intake air.

Each of these resistors are formed of a material, in which phosphorus as impurity is doped in a polycrystalline silicon.

The upstream side heating resistor 140a and the downstream side heating resistor 140b are formed by fine patterning technology on a cavity portion (a space formed by removing a part of the substrate 120) 121 formed on the monocrystalline substrate, via the electrically insulative layer 130 in a form of a film. On the other hand, a part 140d of the air temperature measuring resistor 140c is lead out and formed on the cavity portion 121 via the electrically insulative layer 130. Remaining portion of the air temperature measuring resistor 104c is formed on the monocrystalline silicon substrate 120 at a location offset from the cavity portion 121 so as to hardly influence by heat from the heating resistors 140a and 140b.

On an end portion of the element 110 (end portion of the substrate 120), terminal electrodes 160a to 160g are formed.

One end of the upstream side heating resistor 140a is connected to the terminal electrode 160e by a lead wire 150e. One end of the downstream side heating resistor 140b is connected to the terminal electrode 160f via a lead wire 150f. A junction between the upstream side heating resistor 140a and the downstream side heating resistor 140b is connected to the terminal electrode 160g by the lead wire 150g.

Both ends of the air temperature measuring resistor 140c are connected to the terminal electrodes 160b and 160c by respective lead wires 150b and 150c. On the other hand, lead wires 150a and 150d for detecting a voltage (potential difference) of the part 140d of the air temperature measuring resistor 140d are connected to the terminal electrodes 160a and 160d.

The substrate 120, on which the resistors, lead wires and terminal electrodes set forth above are provided, is covered with a protective layer 180 except for the portions where the terminal electrodes 160a to 160g are formed.

An actual size of the element 110 is in the extent of about 2 mm in a shorter edge and about 6 mm in a longer edge, in the shown embodiment.

On the monocrystalline silicon substrate 120, a silicon dioxide ($SiO_2$) layer 130a and a silicon nitride ($Si_3N_4$) 130b to serve as the electrically insulative layer 130 are stacked. Since the silicon dioxide layer 130a has much smaller thermal expansion coefficient than the monocrystalline silicon substrate 120 in the extent of approximately one tenth. Therefore, by forming the silicon nitride layer 130b having slightly greater thermal expansion coefficient than the monocrystalline silicon substrate 120 and superior mechanical strength, thermal stress between the monocrystalline silicon substrate 120 and the electrically insulative layer 120 can be reduced and thus can improve strength.

On the silicon nitride layer 130b, respective resistors 140a, 140b, 140c and 140d and lead wires 150a to 150g are formed with a material, in which P as impurity is doped in the polycrystalline silicon at high concentration.

Over respective resistors 140a, 140b, 140c and 140d and lead wires 150a to 150g, the protective layer of a stacked structure of a silicon nitride layer 180b and a silicon dioxide 180a is formed. The protective layer 180 is formed for protecting respective resistors 140a, 140b, 140c and 140d from oil, water, fouling or so forth contained in the intake air.

At the substantially center portion of the monocrystalline silicon substrate 120, mounting portions of the heating resistors 140a and 140b are set. In a region below the heating resistor mounting portions, the cavity 121 is formed as a portion where a part of the substrate material is removed.

The cavity portion 121 is formed by removing the monocrystalline silicon substrate 120 up to an interface surface with the electrically insulative layer 130 by anisotropic etching. By forming the cavity portion (substrate removed space portion) 121, a structure, in which the heating resistors 140a and 140b are supported by the electrically insulative layer 130 and the protective layer 180, is established. As a result, the heating resistors 140a and 140b are thermally isolated. Accordingly, in comparison with the case where the cavity portion 121 is not present, the shown construction exhibits superior thermal isolation of the heating resistors 140a and 140b and whereby to achieve improvement of response speed of the thermal type air flow sensor.

Next, a fabrication process of the shown embodiment of the element 110 will be discussed with reference to FIGS. 1 and 2.

On the monocrystalline silicon substrate, after forming the silicon dioxide layer 130a in a thickness of approximately 0.4 μm by way of thermal oxidation or CVD (Chemical Vapor Deposition), the silicon nitride layer 130b in a thickness of approximately 0.2 μm is formed by way of CVD or other method.

Next, as respective resistors 140a, 140b, 140c and 140d and connection lines (lead wires) 150a to 150g, polycrystalline silicon layers in a thickness of approximately 1 μm are formed by way of CVD method, and then, phosphorus as impurity is doped in the polycrystalline silicon layers by thermal diffusion or ion implantation. Thereafter, a resist is formed in a predetermined shape by a photolithographic technology for patterning the semiconductor film by way of ion etching or the like to form the resistors 140a, 140b, 140c and 140d and the connection lines 150a to 150g.

Then, as the protective layer 180, the silicon nitride layer 180b in a thickness of 0.2 μm is formed through CVD and other method. Thereafter, the silicon dioxide layer 180a in a thickness of about 0.4 m is formed by the way of CVD or other method. BY removing portion of the protection layer 180, which portion is located corresponding to the terminal electrodes 160a to 160g, by way of etching to form the terminal electrodes 160a to 160g of aluminum.

Finally, from the back surface of the monocrystalline silicon substrate 120, anisotropic etching is carried out with taking the silicon nitride as mask to form the cavity portion 121. Then, through dicing, the element 110 of the thermal type air flow sensor is obtained.

Next, with reference to FIGS. 3 to 5, construction of the thermal type air flow sensor having the element constructed as set forth above will be discussed.

Figure 3:
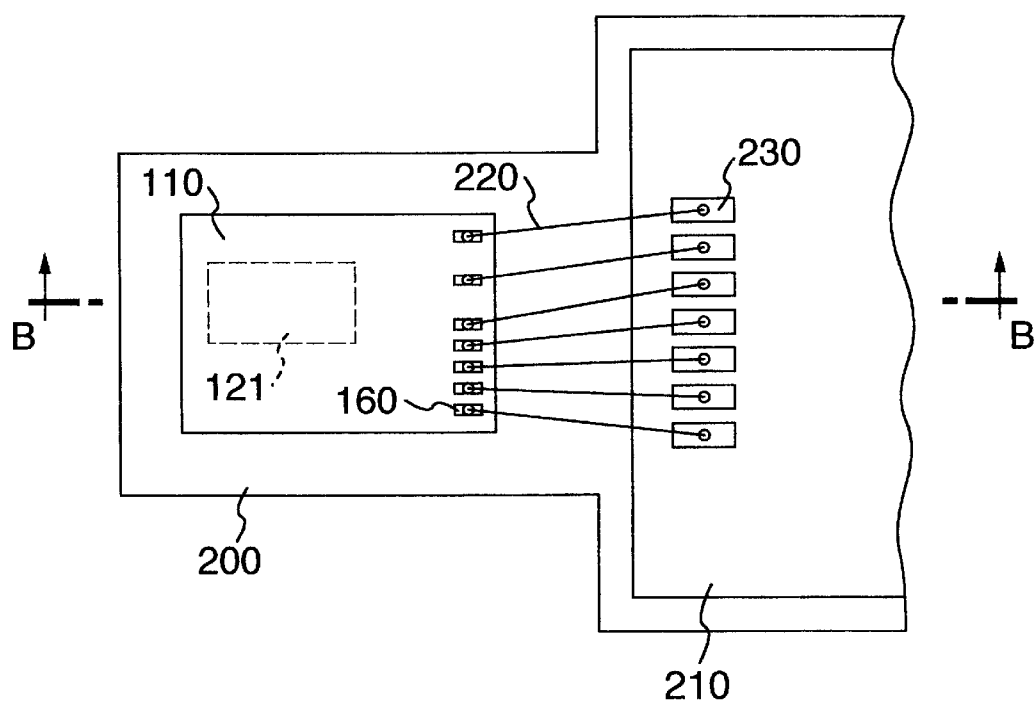
FIG. 3 is a partial plan view showing the first embodiment of a thermal type air flow sensor module.
Figure 4:
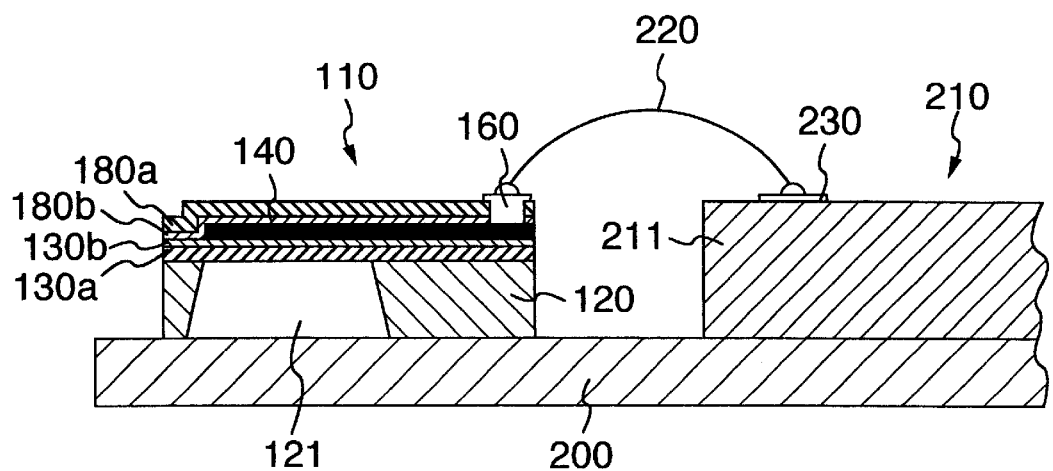
FIG. 4 is a sectional view of the thermal type air flow sensor module of FIG. 3 as taken along line B—B of FIG. 3.
Figure 5:
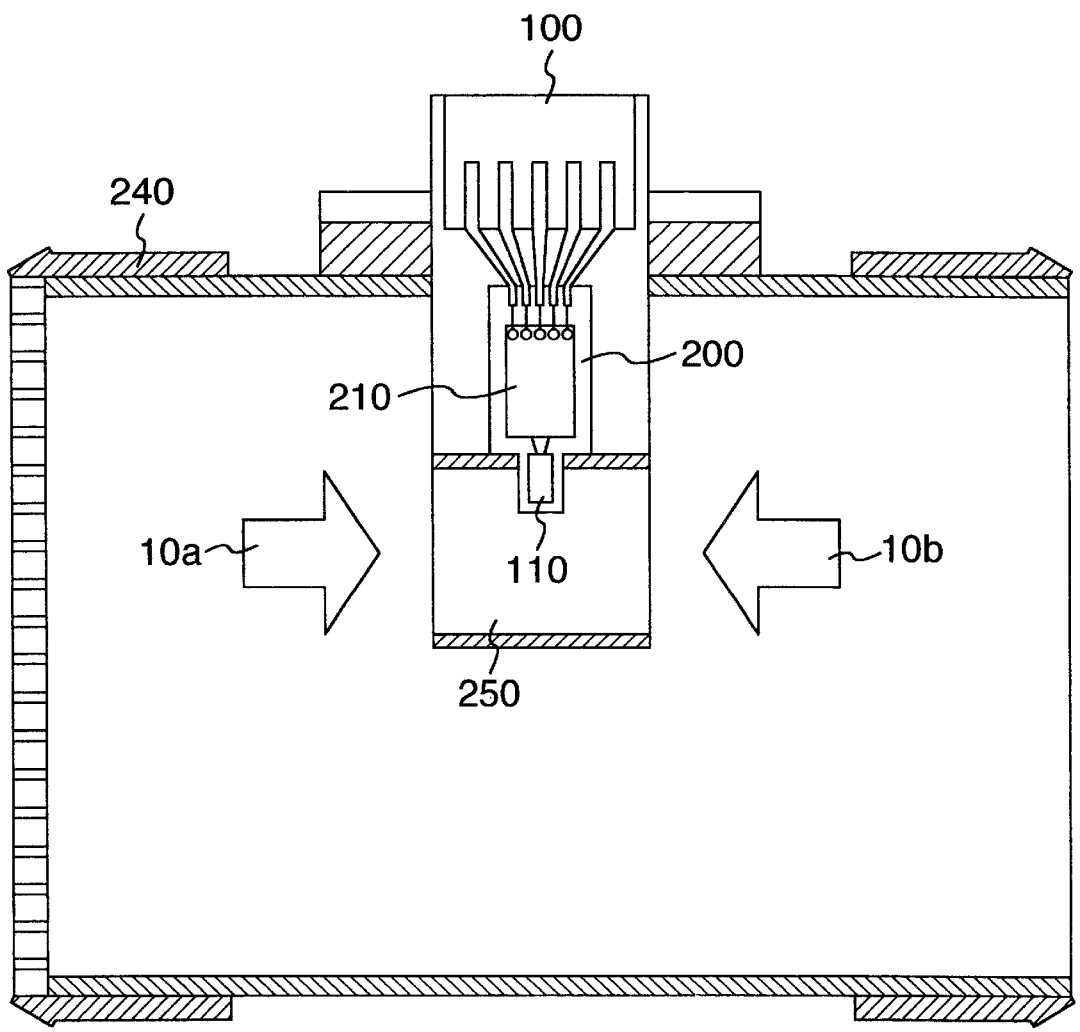
FIG. 5 is a sectional view of the thermal type air flow sensor module mounted in an air flow passage.

FIG. 3 is a plan view of a partially omitted thermal type air flow sensor module having the element 110, FIG. 4 is a sectional view taken along line B—B of FIG. 3, and FIG. 5 is an illustration showing a condition where the sensor module is mounted in an air intake passage 240.

As shown in FIG. 3, the element 110 and a signal processing circuit 21o are fixed on a support 200.

A plurality of terminal electrodes 160a to 160g which will be identified hereinafter by the reference numeral 160 as generally referred to, are connected to a plurality of terminal electrodes 230 of the signal processing circuit 210 by bonding with gold wire or the like. The signal processing circuit 210 is formed on an electrically insulative substrate, such as alimina or the like.

As shown in FIG. 4, the element 110 is mounted on support 200. An opening end of the cavity portion 121 is placed in opened on the side of the support 200.

As shown in FIG. 5, the support 200, on which the element 110 is fixed, is arranged in an auxiliary intake air passage 250 in the air intake passage 240.

Next, a principle of detection of the air flow rate by the air flow rate sensor 110 will be discussed with reference to FIG. 6.

The upstream side heating resistor 140a, the downstream side heating resistor 140b, the air temperature measuring resistor 140c and a part 140d of the air temperature measuring resistor form a bridge circuit together with the fixed resistors R1 and R2. Heat values of the upstream side heating resistor 140a and the downstream side heating resistor 140b are removed depending upon the air flow rate, However, the heating current for the upstream side heating resistor 140a and the downstream side heating resistor 140b is controlled by the operational amplifier Op and the transistor Tr so that temperatures thereof may be maintained to be higher than the temperature of the intake air detected by the air temperature measuring resistor 140c for a given temperature difference ΔTh (e.g. 150° C.). Since the intake air flow rate is proportional to heat values to be removed from the heating resistors 140a and 140b, a value of the current flowing through the heating resistors 140a and 140b corresponds to the air flow rate. This current is converted into the voltage by the resistor R1 for outputting.

Next, principle of directionality detection by the shown embodiment of the thermal type air flow sensor 100 will be discussed with reference to FIGS. 5 and 6.

When the air flow rate is zero, no temperature difference will be caused between the upstream sides heating resistor 140a and the downstream side heating resistor 104b. In contrast to this, when the intake air flows, the temperature of the upstream side heating resistor 140a have higher cooling effect by the intake air 10a than the temperature of the downstream side heating resistor 140b. At this time, the upstream side heating resistor 104a and the downstream side heating resistor 140b are connected in series and the common heating current flows. Therefore, since heating amount is constant, the temperature of the upstream side heating resistor 140a becomes lower value than that of the downstream side heating resistor 104b. On the other hand, if flow direction of the intake air is reversed, the cooling effect becomes opposite so that the downstream side heating resistor 140b may have greater cooling effect than that of the upstream side heating resistor 140a. Thus, temperature of the downstream side heating resistor 140b becomes lower than that of the upstream side heating resistor 140a. Accordingly, by comparing both end voltages of the upstream side heating resistor 140a and the downstream side heating resistor 140b for comparing the temperature (resistance value) of both resistors by an operational amplifier Op3, flow direction if the intake air can be detected.

When the thermal type air flow sensor is installed in the air intake of the internal combustion engine of the automotive vehicle or so froth, air normally flows from an air cleaner toward the engine 10a. In certain operating condition of the internal combustion engine, reverse air flow occasionally occurs in the direction from the engine to the air cleaner (surge flow 10b). Therefore, directionality detecting function set forth above becomes important.

Next, discussion will be given for correction method of variation of characteristics when fouling adheres or deposits on the surface of the thermal type air flow sensor.

The intake air to pass through the thermal type air flow sensor 100 passes through the air cleaner for removing fouling contained in the intake air. However, it is not possible to completely remove fouling by the air cleaner. Thus, the intake air of the internal combustion engine may contain Si, Fe, Ca, Mg, Na contained in solid particle, typically sand, NaCl, $MgCl_2$, $CaCl_2$ contained in snow melting agent, engine lubricant oil contained in blow-by gas, $H_2O$, C, an impregnating oil of an air filter in a wet type air cleaner, and so forth.

Figure 7:
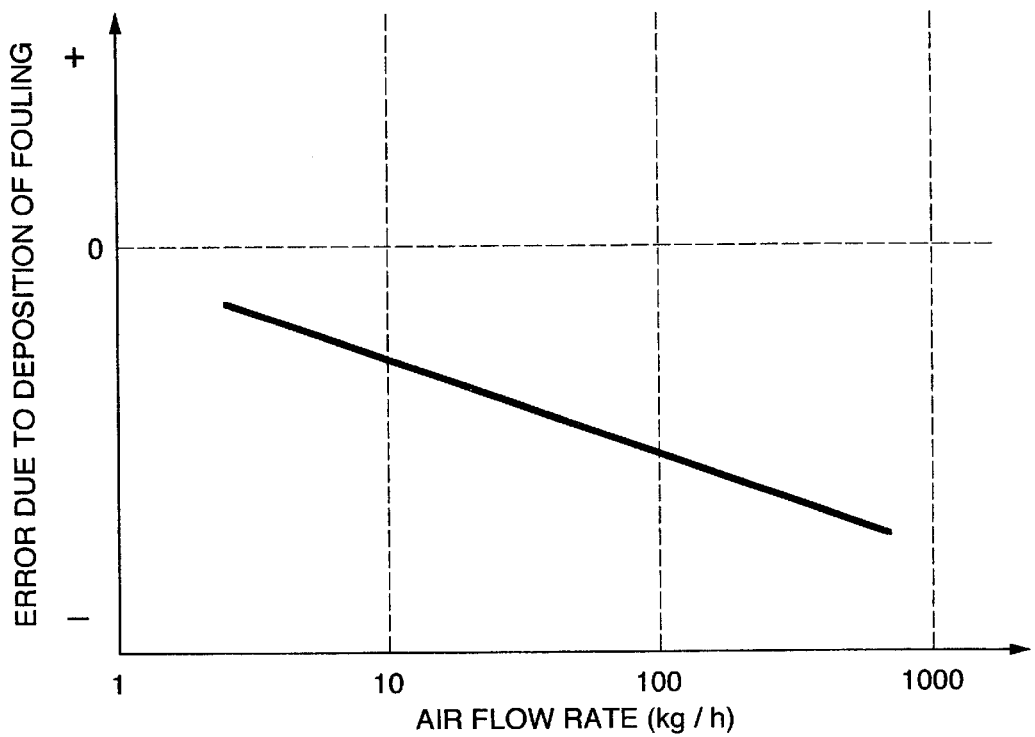
FIG. 7 is a graph showing a measuring error due to deposition of fouling substance.

Since the thermal type air flow sensor element 110 is in direct contact with the intake air containing such fouling, fouling may adhere or deposit on the surface of the thermal type air flow sensor element through long period use. FIG. 7 shows a measuring error when fouling adheres or deposits.

When fouling adheres or deposits on the thermal type air flow sensor element 110, an output voltage relative to the air flow rate should shift toward minus side due to error caused by adherence or deposition of fouling. The reason is that while the heat values of the heating resistors 140a and 140b is transmitted to the protective layer 180 and then transmitted to the air before deposition of fouling, the heat values of the heating resistors 140a and 140b is transmitted to the protective layer 180, then transmitted to the deposited fouling layer and thereafter transmitted to the air. Thus, temperature of the outermost surface contacting with the air is lowered in a magnitude corresponding to the heat value transmitted to the deposited fouling layer to cause lowering of current flowing through the heating resistor with respect to the same air flow rate. In other words, sensitivity of heat exchange between the air flow rate and the heating resistor becomes dull.

Therefore, in the present invention, by arranging a part 140d of the air temperature measuring resistor 140c above the insulation layer 130 (diaphragm identified by 130' in FIG. 2) on the cavity portion (substrate removed space portion) 121 and detecting variation of potential (voltage) at both ends of the air temperature measuring resistor 140d, correction of variation of characteristics can be performed.

Figure 6:
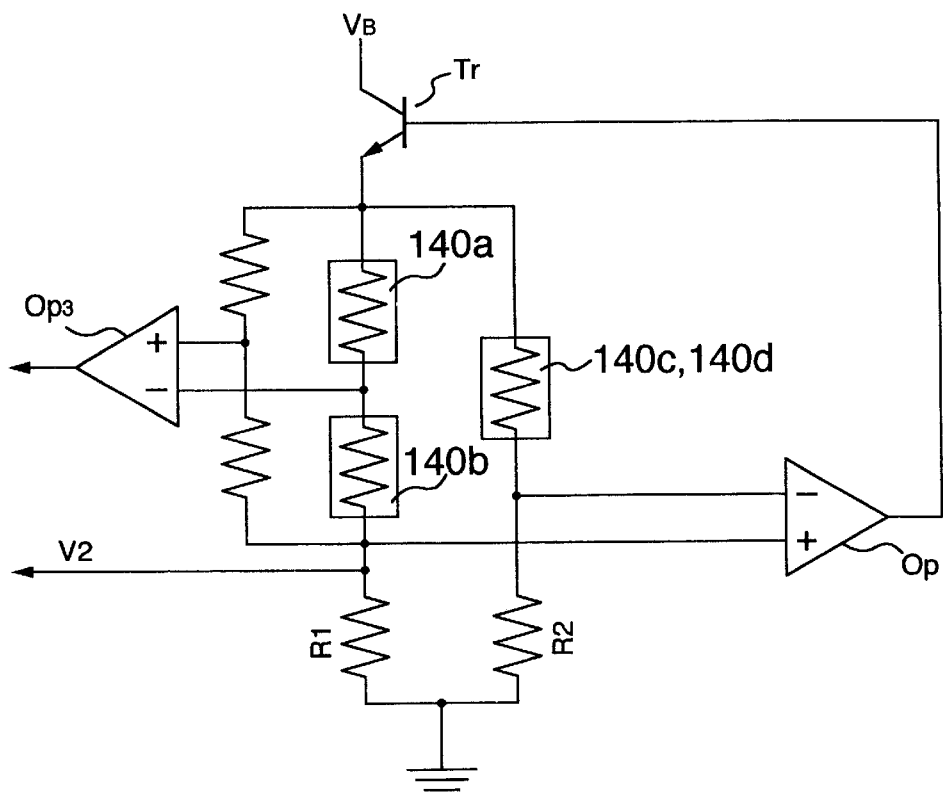
FIG. 6 is a circuit diagram of a driver circuit of the thermal type air flow sensor according to the present invention.

As shown in FIG. 1, the air temperature measuring resistor 140c is arranged outside of the diaphragm 130', and a part 140d thereof forms a bridge circuit together with the heating resistors 140a and 140b as shown in FIG. 6.

Since the resistance value of the air temperature measuring resistor 140c is approximately twenty times of the resistance values of the heating resistors 140a and 140b. Thus, a current in a magnitude of approximately one-twentieth of the current flowing through the heating resistors 104a and 140b, may flow through the air temperature measuring resistor 140c. Thus, the air temperature measuring resistor 140c may generate little heat. However, a part 140d of the air temperature measuring resistor arranged via the electrically insulative layer (electrically insulative film) on the cavity portion 121 is thermally isolated by the cavity portion so as not to transmit the heat to the monocrystalline silicon substrate 120. Thus, the part 140d may cause self-heating a little. The self-heating is caused in the same mechanism as those of heating of the heating resistors 140a and 140b except for current value to flow. Also, since the part 140d of the air temperature measuring resistor 140c is in contact with the intake air completely the same manner as those of the heating resistors 140a and 140b to cause adherence or deposition of fouling similarly to the heating resistors 140a and 140b. Accordingly due to deposition of fouling, the part 140d of the air temperature measuring resistor 140c may cause variation of heat conduction and heat transmission in the similar manner as those of the heating resistors 140a and 140b. Here, as shown in FIG. 1, both ends of the pair 140d of the air temperature measuring resistor 140c are connected to electrodes 160a and 160d via lead wires 150a and 150d. Then, by measuring potential difference Vr, variation of voltage associated with variation of the characteristics due to deposition of fouling is caused.

Figure 8:
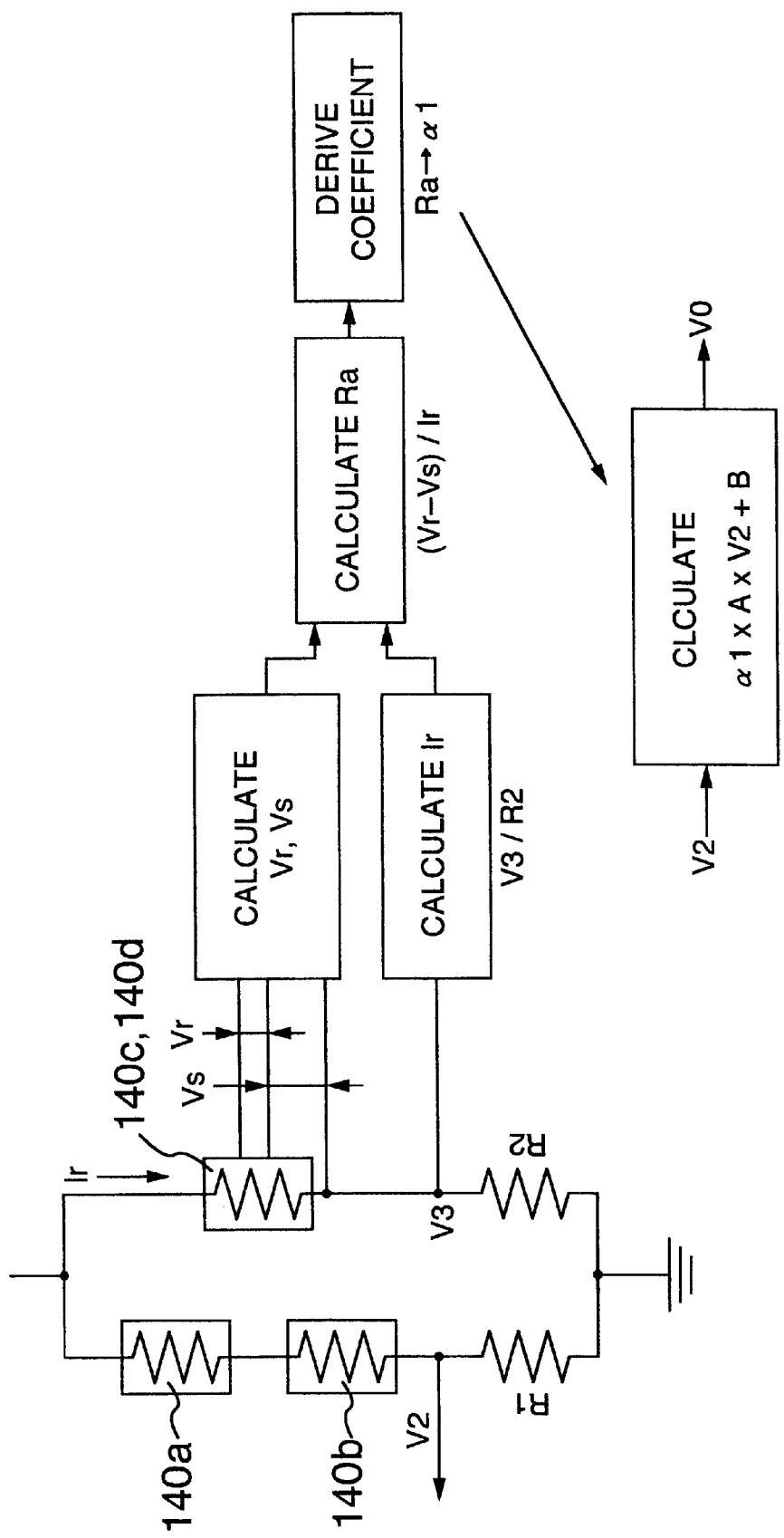
FIG. 8 is a block diagram showing a measuring error correcting method of the present invention.

A block diagram of an arithmetic algorithm showing the first correction method under control by microcomputer using the voltage (potential difference) Vr, is illustrated in FIG. 8.

The potential Vr caused between the electrodes 160a and 160b (air temperature measuring resistor 140c), and a voltage value Vs between the electrodes 160c and 15Y60d, and a current Ir are derived. Here, the current Ir is derived from the resistor R2 and the voltage V3. From Vr, Vs and Ir, the following calculation will be performed:

$$Ra = (Vr - Vs)/Ir \quad (1)$$

By subtracting the potential Vs of the part 140d of the external air temperature measuring resistor located of the cavity portion (diaphragm) 121 from the potential Vr of the part of resistor 140d for removing a component of variation of resistance due to variation of the intake air temperature, only component of resistance variation associated with variation of heading condition due to deposition of fouling (variation of heating condition associated with variation of heat conduction and heat transmission of head generated from the part 140d of the resistor 140c. By calculating V2 with a coefficient α1 derived from Ra, an output of the following equation (2) with correction of variation of heat conduction and heat transmission due to deposition of fouling as shown in FIG. 7 can be obtained.

$$V0 = \alpha1 \times A \times V2 + B \quad (2)$$

wherein A and B are coefficients.

Figure 9:
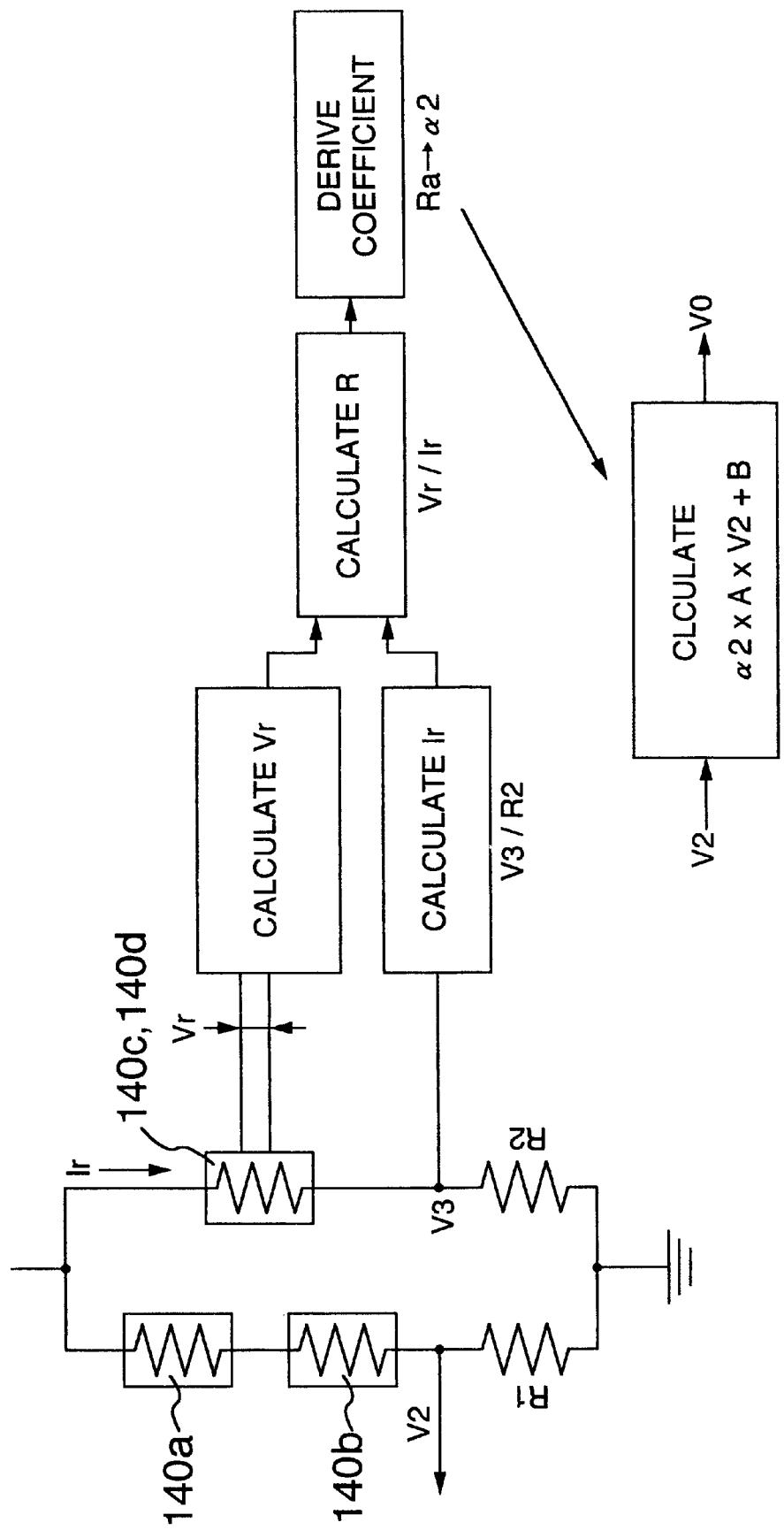
FIG. 9 is a block diagram showing a correction method of the present invention.

Next, an arithmetic algorithm showing the second correction method under control by means of the microcomputer using the potential difference Vr is illustrated in FIG. 9. The shown correction method is a method for aggregately correcting variation of characteristics due to deposition of fouling set forth above and variation of characteristics due to variation of temperature of the intake air.

The potential Vr and current Ir between the electrodes 160a and 160d are calculated. Here, the current Ir is derived from the resistance of the resistor R2 and the potential V3 of the resistor R2. On the basis of Vr and Ir, a resistance of the part 140d of the air temperature measuring resistor 140c is derived through the following equation (3).

$$R = Vr/Ir \quad (3)$$

wherein R is expressed by the following equation (4)

$$R = Ra + Rt \quad (4)$$

wherein Ra is a component of variation of resistance of the heating resistor due to deposition of fouling, and Rt is a component of variation of resistance due to variation of temperature of the intake air. BY calculating V2 with α2 which is coefficient derived from R, an output expressed by the following equation (5), in which variation of heat conduction and heat transmission due to deposition of fouling is corrected, can be obtained.

$$V0 = \alpha2 \times A \times V2 + B \quad (5)$$

wherein A and B are coefficients.

It should be noted that while the shown embodiment forms a diaphragm form insulation layer 130' on the space defined by removing the substrate (cavity portion) 121 and the heating resistors 140a and 140b and the part of 140d of the air temperature measuring resistor 140c are formed on the insulation layer 130', it is also possible to for the insulation layer over the cavity portion 121 in a bridge form in place of the diaphragm portion and to form heating resistors and a pair of the air temperature measuring resistor on the insulation layer.

Figure 10:
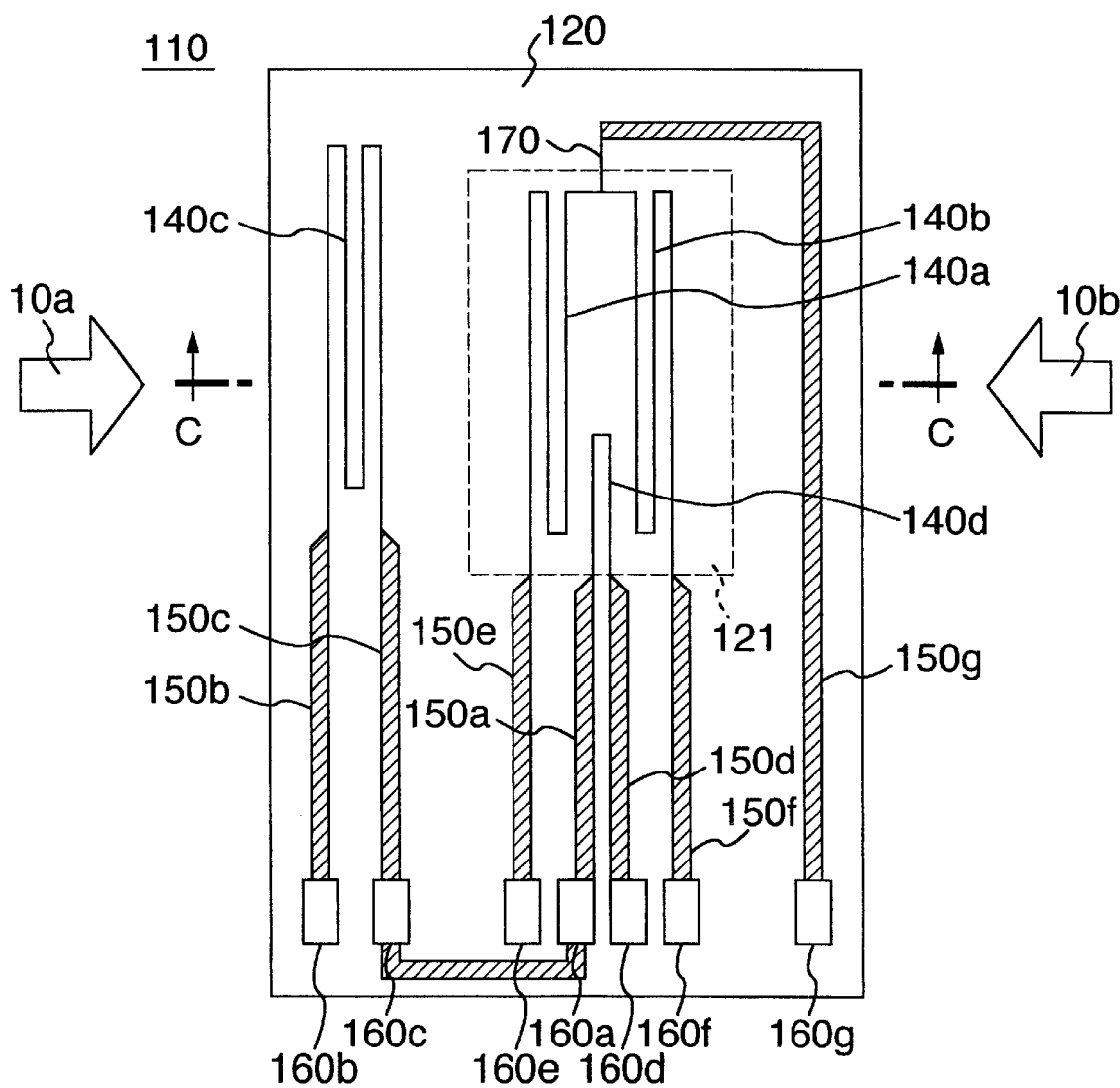
FIG. 10 is a plan view showing an element to be used in the second embodiment of the thermal type air flow sensor according to the present invention.
Figure 11:
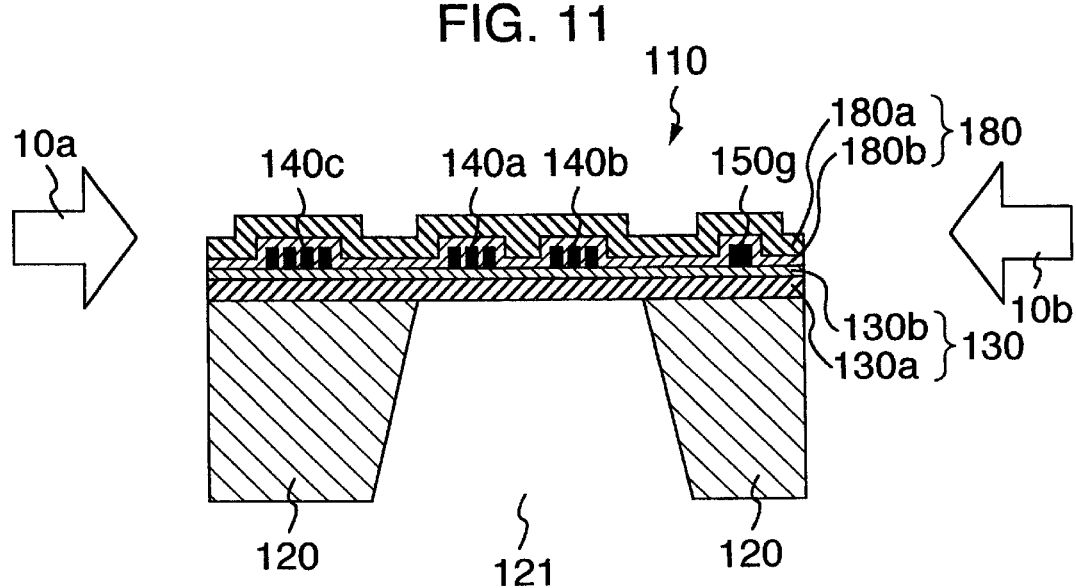
FIG. 11 is a sectional view taken along line A—A of FIG. 10.

Next, concerning the structure of the second embodiment of the thermal type air flow sensor according to the present invention, with reference to FIGS. 10 and 11. FIG. 10 is a plan view of the thermal type air flow sensor element 110 to be employed in the shown embodiment, and FIG. 11 is a sectional view taken along line C—C of FIG. 10.

The element 110 of the shown embodiment is fabricated by forming the electrically insulative layer 130 on the monocrystalline silicon substrate, and the upstream side heating resistor 140a, the downstream side heating resistor 140b, the air temperature measuring resistors 140c and 140d, similarly to the first embodiment set forth above. A point different from the first embodiment is in that the air temperature measuring resistors 140c and 140d are divided into a plurality of fractions (here two). These fractions of the air temperature measuring resistor 104c and 140d are connected in series. Amongst, one resistor 140d is arranged in the cavity portion (substrate removed space portion where is removed).

It should be noted that similarly to the first embodiment, each resistor is formed of a material, in which phosphorus (P) of impurity is doped in the polycrystalline silicon. The upstream side heating resistor 140a and the downstream side heating resistor 140b are formed on the cavity portion 121 formed in the monocrystalline silicon substrate 110. On the other hand, the part 140d of the air temperature measuring resistor 140c is arranged at a position to be influenced by the heat generated by the heating resistors 140a and 140b.

On the end portion of the element 110, the terminal electrodes 160a to 160g are formed. One end of the upstream side heating resistor 140a is connected to the terminal electrode 160e by the lead wire 150e. One end of the downstream side heating resistor 140b are connected to the terminal electrode 160f of the lead wire 150f. The junction 170 between the upstream side heating resistor 140a and the downstream side heating resistor 140b is connected to the terminal electrode 160g by the lead wire 150g. On the other hand, both ends of the air temperature measuring resistor 140c are respectively connected to the terminal electrodes 160b and 160c by the lead wires 150b and 150c. On the other hand, one ends of one air temperature measuring resistor 140d is connected to the terminal electrodes 160a and 160d by the lead wires 150a and 150d. On the other hand, portions other than the terminal electrodes 160 are covered by the protective layer 180.

A sectional structure and a fabrication process of the element 110 and construction of the thermal type air flow sensor 100 are similar to the first embodiment. Therefore, discussion therefor will be omitted for avoiding redundant discussion to keep the disclosure simple enough to facilitate clear understanding of the present invention.

Also, the principle of detection of air flow rate and the principle of detection of flow direction of the intake air are similar to the first embodiment. Therefore, discussion for these principle will also be omitted for avoiding redundant discussion to keep the disclosure simple enough to facilitate clear understanding of the present invention.

Next, by the second embodiment of the present invention, discussion will be given for the correction method of characteristics variation when fouling adheres or deposits on the surface of the thermal type air flow sensor. The air temperature measuring resistor 140c is arranged outside of the diaphragm shown in FIG. 8, similarly to the case of the first embodiment, and forms the bridge circuit together with the heating resistors.

As shown in FIG. 10, in the second embodiment, the part 140d of the air temperature measuring resistor is arranged at the position to be influenced by the heat of the heating resistors 140a and 140b to be heated close to the predetermined temperature ΔTh (e.g. around 150° C.) of the heating resistors 140a and 140b. At this time, similarly to the first embodiment, self-generate heat may also be cased. However, in comparison with heating by the heating resistors 140a and 140b, the self-generated heat is ignorable.

Heating of the part 140d of the air temperature measuring resistor by the heating resistors 140a and 140b is proportional to heat value of the heating resistors 140a and 140b. Accordingly, when heat conduction and heat transmission of the heating resistors 140a and 140b are varied due to adherence or deposition, heat value which the part 140d of the air temperature measuring resistor receives from the heating resistors 140a and 140b, varies similarly.

As shown in FIG. 10, both ends of the part 140d of the air temperature measuring resistor are connected to the electrodes 160a and 160d by the lead wires 150a and 150d to cause variation of voltage according to variation of characteristics due to deposition of fouling.

Using the potential difference Vr, similar to the first embodiment, the output corrected the variation of heat conduction and head transmission due to deposition of fouling by the method shown in FIGS. 8 and 9 can be obtained.

With the present invention set forth above, it becomes possible to prevent variation of the characteristics of the output of the thermal type air flow sensor due to adherence or deposition of fouling onto the surface of the surface of the thermal type air flow sensor element, to maintain initial accuracy of the thermal type air flow sensor. On the other hand, by correction method, it becomes possible to correct characteristics variation including error of characteristics due to variation of intake air temperature.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A thermal type air flow sensor for measuring an air flow rate using a heating resistor and a temperature measuring resistor for measuring an air temperature, comprising:

a semiconductor substrate, a part of which is removed for defining a space therein;

said heating resistor and a portion of said temperature measuring resistor being formed above said space via an electrically insulative layer, remaining portion of said temperature measuring resistor being formed on said semiconductor substrate at a location offsetting from said space; and means for correcting an air flow rate measurement error on the basis of a voltage of said portion of said temperature measuring resistor located above said space.

2. A thermal type air flow sensor as set forth in claim 1, wherein said portion of said temperature measuring resistor located above said space is arranged at a position to be heated by said heating resistor.

3. A thermal type air flow sensor as set forth in claim 2, wherein said electrically insulative layer is formed into a film form.

4. A thermal type air flow sensor as set forth in claim 2, wherein said temperature measuring resistor is formed by connecting a plurality of resistors in series and one of said resistors is located above said space.

5. A thermal type air flow sensor as set forth in claim 1, wherein said electrically insulative layer is formed into a film form.

6. A thermal type air flow sensor as set forth in claim 1, wherein said temperature measuring resistor is formed by connecting a plurality of resistors in series and one of said resistors is located above said space.

* * * * *